(No Model.)
B. S. BENSON.
COMBINED DIFFERENTIAL GEAR AND FRICTION CLUTCH.
No. 285,213. Patented Sept. 18, 1883.
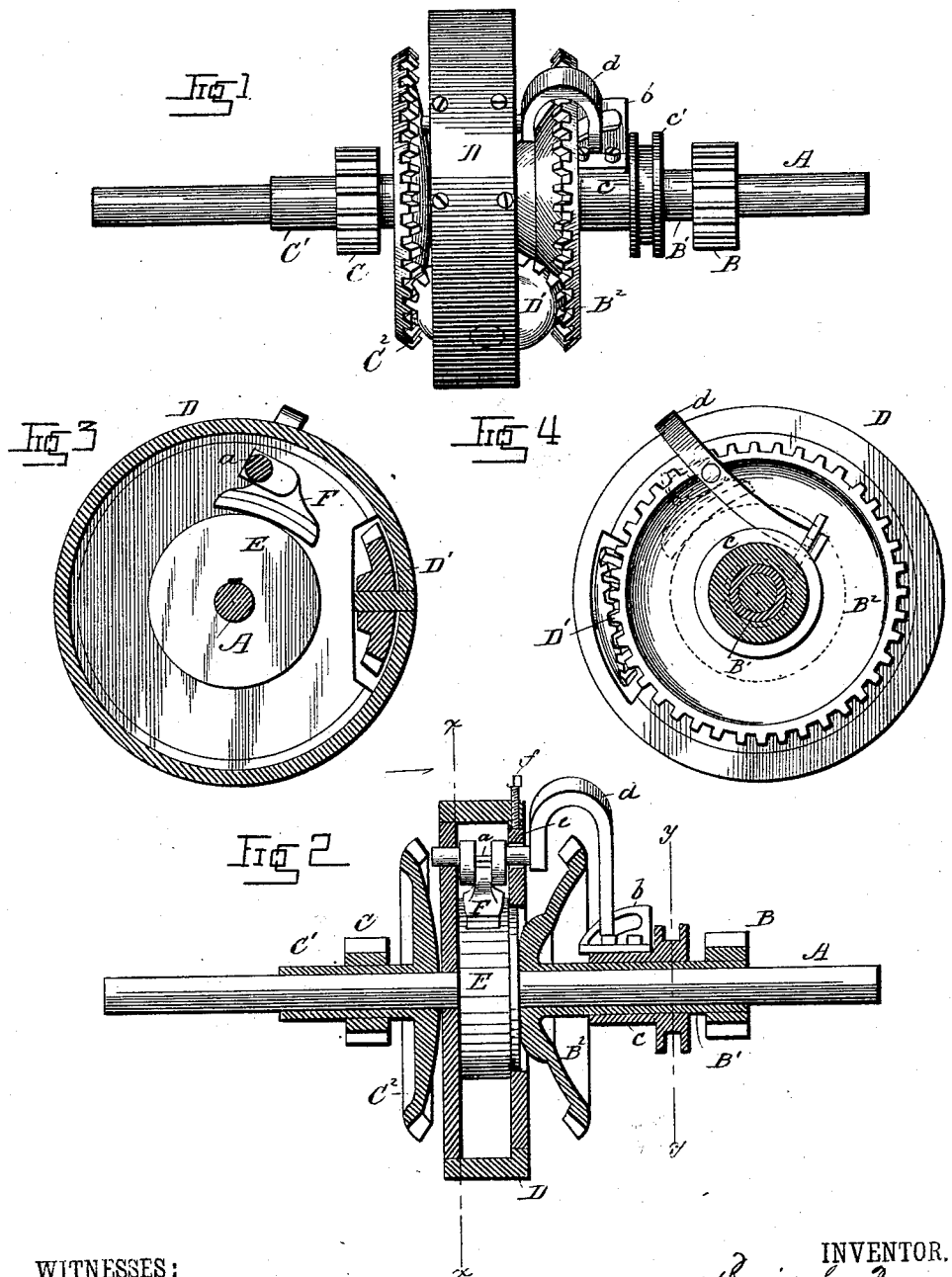
WITNESSES:
INVENTOR.
Benj. S. Benson
By Munn
ATTORNEYS.

UNITED STATES PATENT OFFICE.

BENJAMIN S. BENSON, OF BALTIMORE, MARYLAND.

COMBINED DIFFERENTIAL GEAR AND FRICTION-CLUTCH.

SPECIFICATION forming part of Letters Patent No. 285,213, dated September 18, 1883.

Application filed May 25, 1883. (No model.)

*To all whom it may concern:*

Be it known that I, BENJAMIN S. BENSON, of Baltimore city, and State of Maryland, have invented a new and useful Improvement in a Combined Differential Gear and Friction-Clutch; and I do hereby declare that the following is a full, clear, and exact description of the same, reference being had to the accompanying drawings, forming part of this specification, in which—

Figure 1 is a side elevation of the differential gear. Fig. 2 is a longitudinal section with the shaft and its rigid wheel in side view. Fig. 3 is a section through the line $x\ x$ of Fig. 2, looking in the direction of the arrow; and Fig. 4 is a section through the line $y\ y$ of Fig. 2.

My invention is in the nature of a combined differential gear and friction-clutch designed to permit power to be transmitted from a single shaft independently to two sets of wheels at different speeds, and to permit the power also to be applied with a gradual strain instead of a sudden jerk.

In my patent for a traction-engine, No. 249,451, I showed and described a friction-clutch and differential gear looking to this result; but they had to be placed on different shafts, as there was no known means for arranging them on the same shaft.

The object of my present improvement is to locate both the differential gear and friction-clutch on the same shaft, to secure greater compactness of structure; and to this end it consists in the arrangement and adaptation of the friction-clutch and differential gear on the same shaft, as will be fully described hereinafter.

In the drawings, A represents a single shaft, which imparts motion to two separate trains of gears, (not shown,) which connect, respectively, with the pinions B C. The pinion B is rigidly fixed to a sleeve, B', which is rigidly keyed to a bevel-wheel, $B^2$, and which pinion, sleeve, and bevel-wheel turn loosely on the shaft A. C is another pinion, rigidly fixed to sleeve C', which latter is keyed to another bevel-wheel, $C^2$, of equal diameter to $B^2$, and facing the same. This pinion C, sleeve C', and bevel-wheel $C^2$ also turn loosely on the main shaft. Between the two bevel-wheels $B^2$ and $C^2$ is hung loosely on the main shaft a hollow disk-shaped chamber, D, in which is journaled a bevel-pinion, D', which is arranged near the periphery of the disk upon an axis at right angles to the shaft A, and which bevel-pinion projects through the sides of the hollow chamber and engages with both the bevel-wheels $B^2$ and $C^2$. This bevel-pinion D', with the two bevel-wheels $B^2\ C^2$, constitutes an old form of differential gear, acting as follows: When rotary motion is given to the hollow disk about shaft A, bevel-pinion D' rotates both the gears $B^2$ and $C^2$, but allows them independent motion, so that one may move faster than the other, or one may stop and the other move. In illustration of how this is accomplished I would state that in turning a curve the inside wheel must stop or move slower, while the outside wheel is rounding the greater curve, and if we suppose pinion B to be connected with the inside wheel in turning and C with the outside wheel, then B and its bevel-gear $B^2$ may stop and run slower, while the casing D and pinion D' turn bevel-gear $C^2$ and pinion C with an increased speed, the pinion D' traversing under such circumstances the relatively stationary bevel-gear $B^2$ with a secondary rotation about its (the pinion) own axis. For turning in the other direction, the pinion D' traverses bevel-gear $C^2$. Now, to cause the hollow disk to start in motion gradually from the power of the shaft A, this hollow disk, instead of being tight or rigid on the shaft A, as usual, is loose on said shaft, while a wheel, E, inside of this hollow disk, is rigid or tight on said shaft.

F is a friction-clutch hung to the hollow disk, and adapted to be adjusted into bearing contact with the wheel E at the will of the engineer. This clutch, it will be seen, by clamping the wheel to the hollow disk with a gradual frictional contact, causes the power of the shaft to be gradually transmitted from the wheel on the shaft to the hollow disk, and thence to the bevel-wheels, so that the hollow disk does not move off with a jerk, but the clutch slips over the wheel until the inertia of the hollow disk is overcome, at which time the hollow disk partakes also of the motion of the shaft and wheel. For adjusting this clutch F to or from the wheel E it is hung upon a short crank-shaft, $a$, which is arranged in bearings in the hollow disk parallel with shaft A, and which shaft $a$ has attached to it, outside of the hollow disk, a bent arm, $d$, that passes over the bevel-wheel $B^2$, and which is deflected to rock said shaft $a$ by a slotted cam-plate, $b$, attached to a sleeve, $c$, and grooved collar $c'$, which sleeve and collar slide longitudinally on the sleeve $B'$, and by said cam-slot turn the arm $d$ and throw the clutch to or from the wheel E, according to the direction in which sleeve $c$ is thrown. For adjusting this sleeve, a forked lever is arranged with its two branches in the groove of the collar $c'$, or any other suitable device may be used for this purpose.

In making use of my invention, I do not limit myself to a single clutch, F, but may use two, three, or four, or any other number, as may be found desirable. As the clutches wear away they require to be set close to the wheel E, and for this purpose the box or bearing $e$ of the shaft $a$, carrying said clutch, is made adjustable toward the center by set-screw $f$.

Having thus described my invention, what I claim as new is—

1. The combination of a shaft having a rigid wheel, a hollow disk hung loosely on said shaft, and provided with a friction-clutch adapted to engage with said wheel, and a toothed pinion arranged on an axis at right angles to the said shaft, and gear-wheels arranged upon opposite sides of said pinion and hung loosely on the shaft, substantially as shown and described.

2. The friction-clutch F and friction-wheel E, arranged between and combined with the two parallel bevel-wheels of a differential gear, substantially as shown and described.

3. The friction-clutch F, hung upon crank-shaft $a$, having arm $d$ bent over the outside bevel-wheel, and combined with the hollow disk, the wheel E, and means for rocking the said arm, as described.

4. The combination, with the friction-clutch F, within the hollow disk, of the shaft $a$, bent arm $d$, the slotted cam-plate $b$, and sleeve $c$, as shown and described.

5. The friction-clutch F and shaft $a$, in combination with the hollow disk and adjustable bearings for the shaft $a$, as described.

6. The combination of a differential gear and a friction-clutch, the latter being arranged on the same shaft as the differential gear and within the hollow disk of the latter, as described.

BENJAMIN S. BENSON.

Witnesses:
I. C. BENSON,
B. S. BENSON of J.